(12) United States Patent
Shaffer

(10) Patent No.: US 8,869,833 B2
(45) Date of Patent: Oct. 28, 2014

(54) WATER DIVERTER ASSEMBLY FOR A WATER FILTER

(71) Applicant: General Electric Company, Schenectady, NY (US)

(72) Inventor: Timothy Scott Shaffer, LaGrange, KY (US)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 13/736,312

(22) Filed: Jan. 8, 2013

(65) Prior Publication Data

US 2014/0190582 A1 Jul. 10, 2014

(51) Int. Cl.
*F16K 11/08* (2006.01)
*F16K 11/00* (2006.01)

(52) U.S. Cl.
CPC ........................... *F16K 11/00* (2013.01)
USPC ...................... 137/625.41; 239/443

(58) Field of Classification Search
USPC .............. 137/597, 625.41; 239/25, 443, 444, 239/445; 210/449
See application file for complete search history.

(56) References Cited

U.S. PATENT DOCUMENTS

| | | | | |
|---|---|---|---|---|
| 5,057,214 | A | * | 10/1991 | Morris .......................... 210/136 |
| 5,510,031 | A | | 4/1996 | Knauf, Jr. et al. |
| 6,179,130 | B1 | * | 1/2001 | Nguyen et al. ................ 210/424 |
| 6,183,636 | B1 | * | 2/2001 | Bowers et al. ................ 210/232 |
| 6,394,127 | B1 | * | 5/2002 | Creswell et al. .............. 137/544 |
| 6,959,731 | B2 | * | 11/2005 | Bartkus et al. ........... 137/625.46 |
| 7,465,399 | B1 | * | 12/2008 | Hoeptner, III ................ 210/652 |
| 7,717,131 | B2 | * | 5/2010 | Creswell et al. ......... 137/625.46 |
| 7,717,270 | B2 | * | 5/2010 | Boyd et al. .................... 210/460 |
| 8,505,579 | B2 | * | 8/2013 | Esche et al. ................. 137/625.4 |

* cited by examiner

*Primary Examiner* — John Fox
(74) *Attorney, Agent, or Firm* — Dority & Manning, P.A.

(57) ABSTRACT

A water diverter assembly is provided. The water diverter assembly includes a valve and a selecting mechanism. The selecting mechanism permits adjustment of the valve. Such adjustment can selectively direct a flow of filtered water or a flow of unfiltered water through the valve. The water diverter assembly also includes an auxiliary filtered water connection.

20 Claims, 3 Drawing Sheets

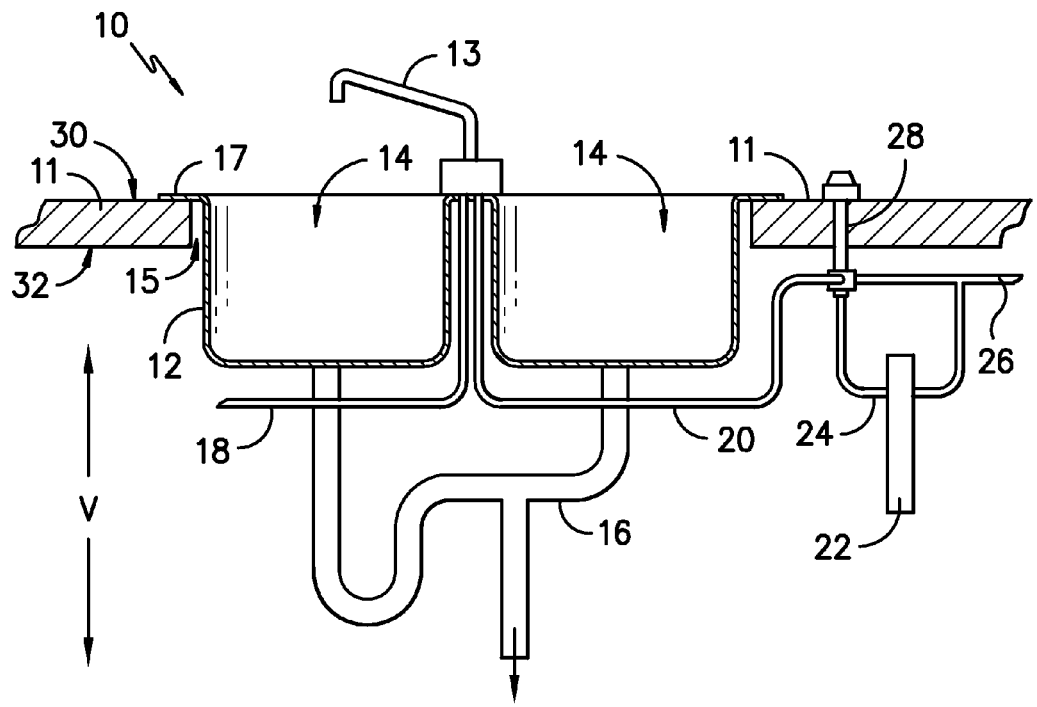
FIG. -1-
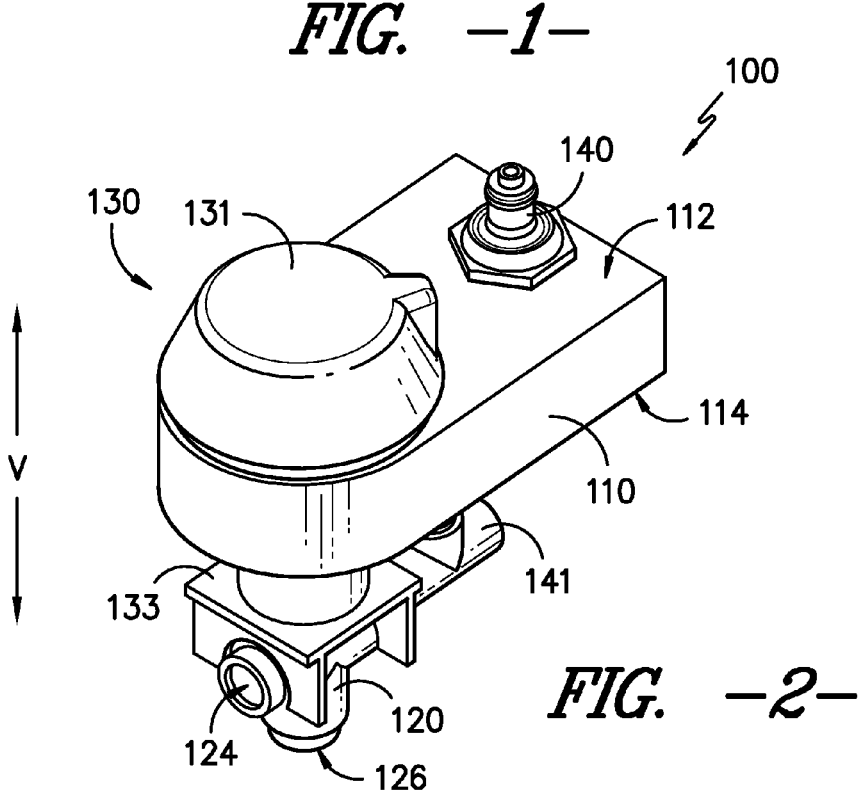
FIG. -2-

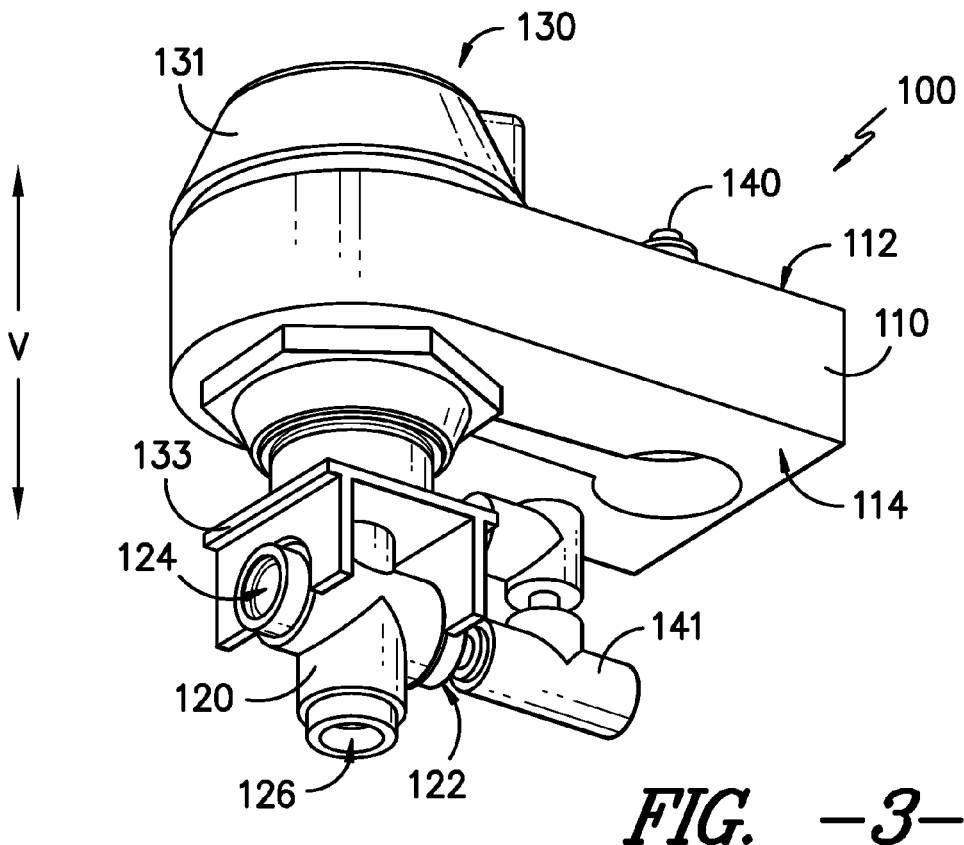
FIG. -3-
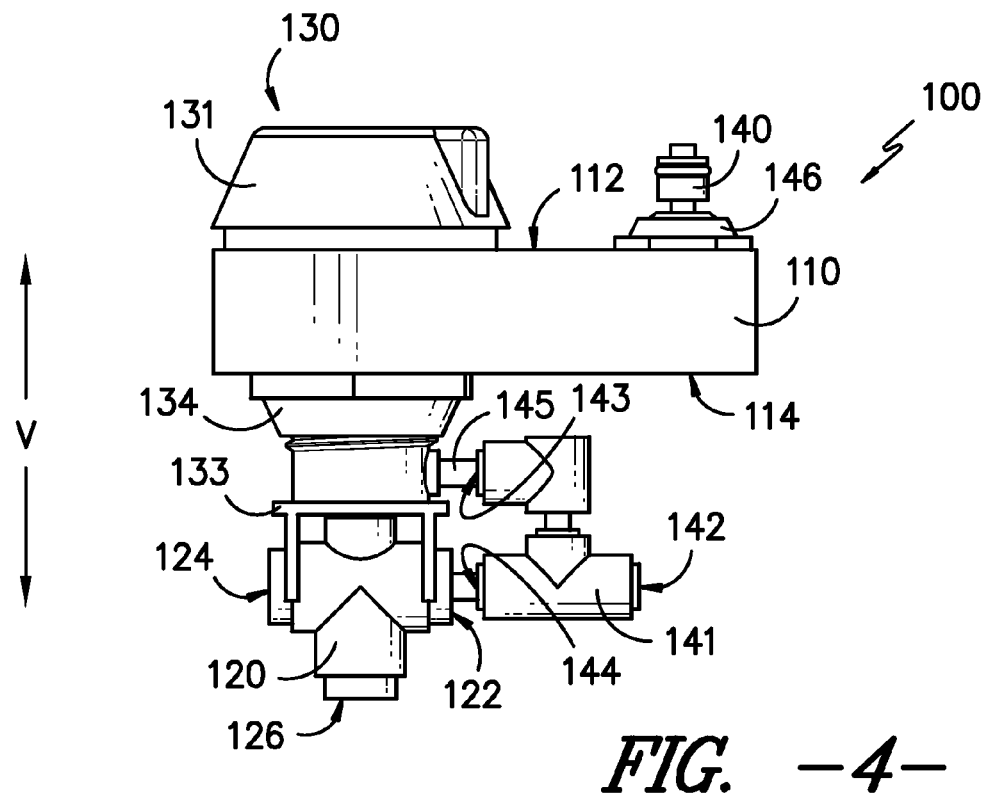
FIG. -4-

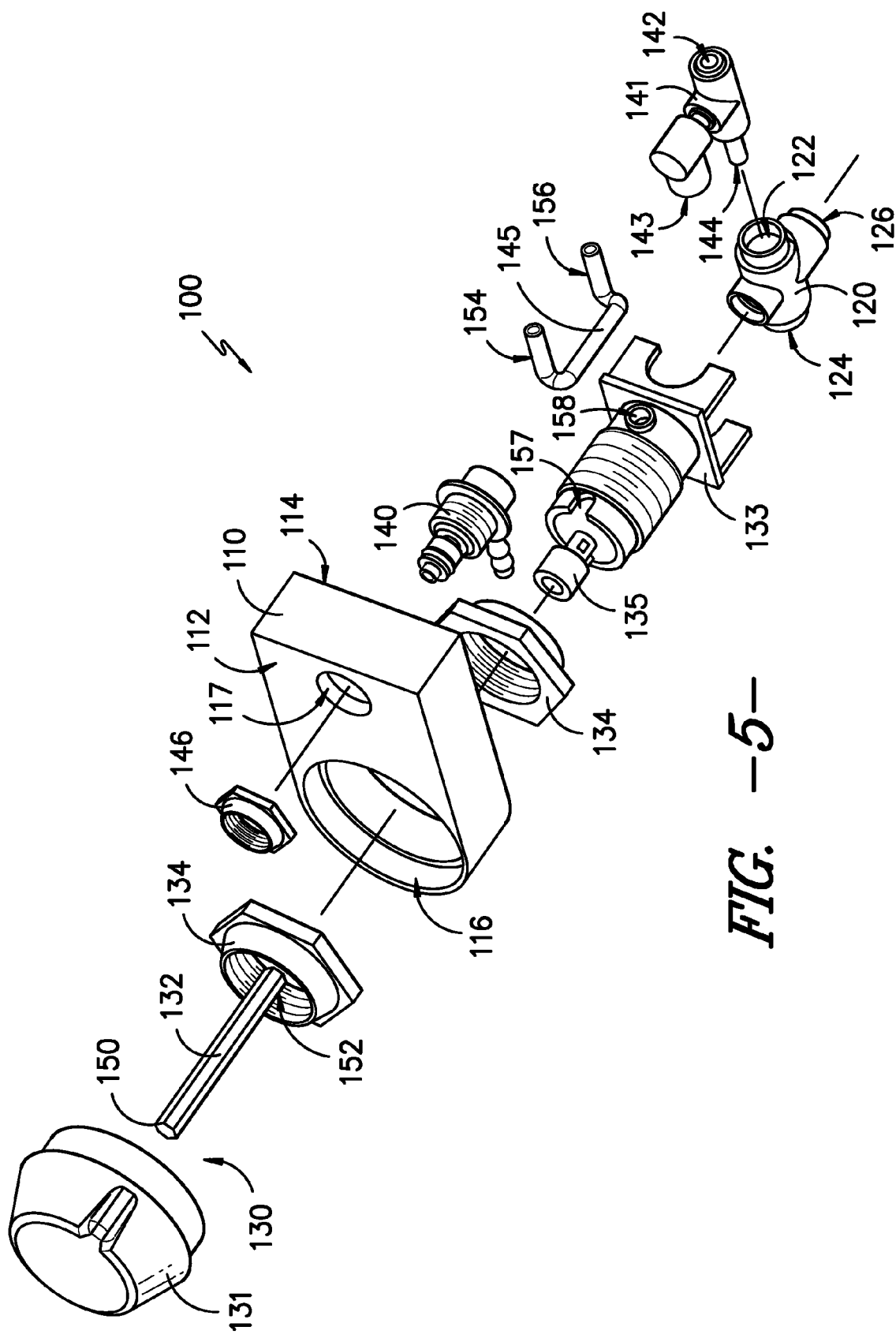
FIG. -5-

WATER DIVERTER ASSEMBLY FOR A WATER FILTER

FIELD OF THE INVENTION

The present subject matter relates generally to water diverters, e.g., for water filters.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In particular, water filters are generally provided with a filtering media such as a block of activated carbon. The water filter's filtering media can adsorb or remove contaminants such as chlorine and lead from water prior to delivering such water to a user.

The water filter's filtering media generally has a limited useful life. In particular, the filtering media can generally only filter a certain volume of water before exhausting the filter's capacity. Thus, the water filter's filtering media is preferably replaced or serviced at regular intervals to insure that the water filter is working properly. However, replacements and servicing can be time consuming and expensive.

Filtered water is generally utilized for consumption such as drinking. However, when installed at a kitchen sink, filtered water provided by a water filter may be utilized for many tasks such as cleaning dishes or washing hands for which filtered water is neither needed or preferred. Thus, the water filter's filtering media can reach its filtering capacity despite wasting a large volume of filtered water on various unneeded uses.

Accordingly, a water filtering assembly with features for selectively accessing a flow of filtered water would be useful. In particular, a water filtering assembly with features for selectively initiating and terminating a flow of filtered water would be useful.

In addition, many countertop appliances such as coffee makers can utilize filtered water to improve their performance. Accordingly, a water filtering assembly with features for permitting a countertop appliance to receive filtered water from the water filtering assembly would be useful. In particular, a water filtering assembly mounted below a countertop that includes features for permitting a countertop appliance sitting on top of the countertop to receive filtered water from the water filtering assembly would be useful.

BRIEF DESCRIPTION OF THE INVENTION

The present subject matter provides a water diverter assembly. The water diverter assembly includes a valve and a selecting mechanism. The selecting mechanism permits adjustment of the valve. Such adjustment can selectively direct a flow of filtered water or a flow of unfiltered water through the valve. The water diverter assembly also includes an auxiliary filtered water connection. Additional aspects and advantages of the invention will be set forth in part in the following description, or may be apparent from the description, or may be learned through practice of the invention.

In a first exemplary embodiment, a water diverter assembly is provided. The water diverter assembly defines a vertical direction. The water diverter assembly includes a support stand having an upper surface and a lower surface. The lower surface is positioned opposite the upper surface. A three way valve is mounted to the support stand adjacent the lower surface of the support stand. The three way valve has a filtered water inlet, an unfiltered water inlet, and an outlet. The three way valve is selectively adjustable between a first configuration and a second configuration. The filtered water inlet is in fluid communication with the outlet in the first configuration. The unfiltered water inlet is in fluid communication with the outlet in the second configuration. A selecting mechanism is mounted to the support stand adjacent the upper surface of the support stand. The selecting mechanism is in mechanical communication with the three way valve in order to selectively adjust the three way valve between the first and second configurations. An auxiliary filtered water connection is mounted to the support stand adjacent the upper surface of the support stand. The auxiliary filtered water connection is in fluid communication with filtered water inlet of the three way valve.

In a second exemplary embodiment, a water diverter assembly is provided. The water diverter assembly includes a support stand having an upper surface and a lower surface. The lower surface of the support stand is positioned opposite the upper surface of the support stand. A valve is mounted to the support stand adjacent the lower surface of the support stand. The valve has a filtered water inlet, an unfiltered water inlet, and an outlet. The outlet is in selective fluid communication with either the filtered water inlet or the unfiltered water. A selecting mechanism is mounted to the support stand adjacent the upper surface of the support stand. The selecting mechanism is configured for selectively adjusting the valve in order to place the outlet of the valve in fluid communication with either the filtered water inlet or the unfiltered water depending upon the type of water selected. An auxiliary filtered water connection is mounted to the support stand adjacent the upper surface of the support stand. The auxiliary filtered water connection is in fluid communication with filtered water inlet of the valve.

In a third exemplary embodiment, a water diverter assembly is provided. The water diverter assembly includes a support stand configured for resting on a top surface of a countertop when the water diverter is mounted to the countertop. A valve is mounted to the support stand. The valve has a filtered water inlet, an unfiltered water inlet, and an outlet. The outlet is in selective fluid communication with either the filtered water inlet or the unfiltered water. The valve is configured for being positioned below a bottom surface of the countertop when the water diverter is mounted to the countertop. A selecting mechanism mounted to the support stand. The selecting mechanism is configured for selectively adjusting the valve in order to place the outlet of the valve in fluid communication with either the filtered water inlet or the unfiltered water depending upon the type of water selected. The selecting mechanism is configured for being positioned above the top surface of the countertop when the water diverter is mounted to the countertop. An auxiliary filtered water connection is mounted to the support stand. The auxiliary filtered water connection is in fluid communication with filtered water inlet of the valve. The auxiliary filtered water connection is configured for being positioned above the top surface of the countertop when the water diverter is mounted to the countertop.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a section view of a plumbing assembly according to an exemplary embodiment of the present subject matter. The plumbing assembly includes a sink mounted to a countertop and a water diverter assembly mounted to the countertop and that regulates a flow of water to a faucet of the sink. The water diverter assembly selectively switches the flow of water to the faucet between unfiltered water and filtered water from a water filtering assembly.

FIG. 2 illustrates a top, perspective view of a water diverter assembly according to an exemplary embodiment of the present subject matter.

FIG. 3 provides a bottom, perspective view of the water diverter assembly of FIG. 2.

FIG. 4 is a side, elevation view of the water diverter assembly of FIG. 2.

FIG. 5 illustrates an exploded view of the water diverter assembly of FIG. 2.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a section view of a plumbing assembly 10 according to an exemplary embodiment of the present subject matter. The plumbing assembly 10 includes a sink 12 mounted to a countertop 11. Countertop 11 includes a top surface 30 and a bottom surface 32. Top surface 30 is positioned opposite bottom surface 32 such that top and bottom surfaces 30 and 32 are spaced apart along a vertical direction V. Countertop 11 defines an aperture 15 that extends through countertop 11 between top and bottom surfaces 30 and 32. Sink 12 sits within aperture 15 such that a lip 17 of sink 12 rests on top surface 30 of countertop 11. Lip 17 supports sink 12 on countertop 11 and, e.g., hinders sink 12 from falling through aperture 15 along the vertical direction V.

Sink 12 includes a faucet 13 that selectively directs water into basins 14 defined by sink 12. As an example, a user can actuate faucet 13 in order to direct water towards one of basins 14. Such water can be used to clean dishes or other items within basins 14, wash the user's hands, and/or fill a container such as a cup to facilitate consumption of the water. Plumbing assembly 10 also includes a drain 16 that directs waste (e.g., liquids such as water and solids such as food particles) out of basins 14 of sink 12, e.g., to a sewer or septic system.

Faucet 13 of sink 12 is in fluid communication with a cold water conduit 20 and hot water conduit 18. Thus, faucet 13 can selectively direct heated water from hot water conduit 18 and/or cooler water (relative to heated water) from cold water conduit towards basins 14. Hot water conduit 18 is configured for receipt of heated water, e.g., from a hot water heater (not shown). Conversely, cold water conduit 20 is configured for receipt of cooler water from a water source (not shown) such as a municipal water supply or a well.

When rinsing dishes and/or consuming water from faucet 13, a user may prefer filtered water. Accordingly, plumbing assembly 10 includes features for selectively providing filtered water to faucet 13. In particular, plumbing assembly 10 includes a water filtering assembly 22 for filtering water from the water source described above. Water filtering assembly 22 includes a filtering media (not shown) such as, e.g., UV bulbs, ceramic filters, activated carbon filters, polymer filters, reverse osmosis filters, or combinations thereof. The filtering media can remove contaminants such as chlorine, chloroform, lead, arsenic, pharmaceuticals, microbes, and/or other undesirable substances from water. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Cold water conduit 20 can receive either filtered water from water filtering assembly 22 or unfiltered water directly from the water source described above. In particular, the water source provides unfiltered water to an unfiltered water conduit 26. Water filtering assembly 22 receives unfiltered water from unfiltered water conduit 26 and cleans or filters such water such that it exits water filtering assembly 22 into a filtered water conduit 24 as filtered water. Thus, plumbing assembly 10 is configured for directing either filtered water from filtered water conduit 24 to cold water conduit 20 and faucet 13 or unfiltered water from unfiltered water conduit 26 to cold water conduit 20 and faucet 13.

A water diverter assembly 28 is mounted to countertop 12 and is in fluid communication with filtered water conduit 24, unfiltered water conduit 26, and cold water conduit 20. Water diverter assembly 28 selectively directs either filtered water from filtered water conduit 24 or unfiltered water directly from unfiltered water conduit 26 to faucet 13. Thus, water diverter assembly 28 regulates whether filtered water or unfiltered water is supplied to faucet 13. As an example, a user washing dishes may prefer to utilize unfiltered water. Conversely, the user may prefer filtered water for drinking. The user can utilize water diverter assembly 28 to switch between filtered water and unfiltered water at faucet 13. Thus, e.g., a useful life of filtering media within water filtration assembly 22 can be extended by avoiding unnecessary or excessive use of water filtration assembly 22 when filtered water is not required or desired at faucet 13.

FIG. 2 illustrates a top, perspective view of a water diverter assembly 100 according to an exemplary embodiment of the present subject matter. Water diverter assembly 100 can, e.g., be utilized within a plumbing assembly such as plumbing assembly 10 (FIG. 1). Thus, water diverter assembly 100 can selectively direct either filtered water or unfiltered water to an outlet depending upon a user selection.

Water diverter assembly 100 includes a support stand 110. Support stand 110 can, e.g., rest on top surface 30 of countertop 11 (FIG. 1) or be positioned on bottom surface 32 of countertop 11 (FIG. 1). Support stand 110 includes an upper surface 112 and a lower surface 114. Lower surface 114 is positioned opposite upper surface 112 on support stand 110 such that upper and lower surfaces 112 and 114 are spaced apart along the vertical direction V. Support stand 110 can be constructed of any suitable material, e.g., a metal such as aluminum or a plastic such as polyethylene.

Water diverter assembly 100 includes a valve 120, e.g., a three-way valve such as a three port ball valve, mounted to support stand 110 adjacent lower surface 112 of support stand 110. Valve 120 is configured for receipt of both filtered water and unfiltered water. In particular, valve 120 is configured for permitting either filtered water or unfiltered water to pass through valve 120 as discussed in greater detail below. Valve 120 is also configured for being positioned below countertop 11 when water diverter assembly 100 is utilized in plumbing assembly 10 (FIG. 1).

Water diverter assembly 100 includes a selecting mechanism 130 mounted to support stand 110 adjacent upper surface 114 of support stand 100. Selecting mechanism 130 is in mechanical communication with valve 120. Thus, selecting mechanism 130 is configured for permitting a user to adjust valve 120. In particular, the user can utilize selecting mechanism 130 to adjust valve 120 such that either filtered water or unfiltered water passes through valve 120. Selecting mechanism 130 includes a knob 131 that the user can actuate in order to select either filtered water or unfiltered water. However, in alternative exemplary embodiments, selecting mechanism may include any suitable mechanism for a user to actuate valve 120. For example, selecting mechanism 130 may include a dial, switch, or button.

Water diverter assembly 100 further includes an auxiliary filtered water connection 140 mounted to support stand 110 adjacent the upper surface 114 of support stand 110. Auxiliary filtered water connection 140 is configured to receive filtered water as discussed in greater detail below. Auxiliary filtered water connection 140 can supply such filtered water to an appliance (not shown) such as a coffee maker or tea pot. As an example, a hose or tube (not shown) can extend between auxiliary filtered water connection 140 and the appliance that is positioned on top surface 30 of countertop 11 (FIG. 1). Thus, auxiliary filtered water connection 140 can supply filtered water through countertop 11 to appliances positioned on top surface 30 of countertop 11. As will be understood by those skilled in the art, auxiliary filtered water connection 140 can include a stop or non-spill valve for hindering filtered water from leaking out of auxiliary filtered water connection 140, e.g., when auxiliary filtered water connection 140 is not supplying filtered water to an appliance on countertop 11. As an example, the non-spill valve may include a Colder Products NS2D1204 having an internal valve that is spring loaded such that it closes off a flow of filtered water when not connected to the appliance. Conversely, when connected to the appliance, the internal valve and the spring are pushed back such that the flow of filtered water is permitted.

FIG. 3 provides a bottom, perspective view of water diverter assembly 100. As may be seen in FIG. 3, valve 120 has a filtered water inlet 122, an unfiltered water inlet 124, and an outlet 126. As discussed above, valve 120 can selectively permit either filtered water or unfiltered water to pass through valve 120. In particular, valve 120 is selectively adjustable between a first configuration and a second configuration. Filtered water inlet 122 of valve 120 is in fluid communication with outlet 126 in the first configuration. Conversely, unfiltered water inlet 124 is in fluid communication with outlet 126 in the second configuration. Thus, valve 120 can permit filtered water to flow through valve 120 from filtered water inlet 122 to outlet 126 in the first configuration, and valve 120 can permit unfiltered water to flow through valve 120 from unfiltered water inlet 124 to outlet 126 in the second configuration.

A user can utilize selecting mechanism 130 on upper surface 114 of support stand 110 to selectively adjust valve 120 between the first and second configurations. As an example, when water diverter assembly 100 is mounted to countertop 11 (FIG. 1), selecting mechanism 130 can permit the user to select between filtered water and unfiltered water without having to access an area below countertop 11. Thus, water diverter assembly 100 can provide improved convenience to the user.

FIG. 4 is a side, elevation view of water diverter assembly 100. FIG. 5 illustrates an exploded view of water diverter assembly 100. As may be seen in FIG. 5, support stand 110 defines a first hole 116 and a second hole 117 through support block 110, e.g., from lower surface 112 to upper surface 114. A bracket 133 is mounted to support stand 110 at first hole 116 with retaining nuts 134. In particular, retaining nuts 134 can be threaded to bracket 133 on opposite sides of support block 110, and retaining nuts 134 can then be urged or rotated towards one another in order to fix or secure bracket to support stand 110. Bracket 133 supports valve 120 and mounts valve 120 to support stand 110, e.g., at first hole 116. In a similar manner, auxiliary filtered water connection 140 is mounted to stand 110 at second hole 117. In particular, a retaining nut 146 can be threaded to auxiliary filtered water connection 140 in order to secure or fix auxiliary filtered water connection 140 to support stand 110, e.g., at second hole 117.

Selecting mechanism 130 includes a stem 132. Stem 132 extends longitudinally between a top portion 150 and a bottom portion 152. In particular, stem 132 extends between valve 120 and knob 131 in order to couple valve 120 and knob 131 together such that a user can selectively actuate valve 120 with knob 131, e.g., between the first and second configurations described above. Thus, top portion 150 of stem 132 is positioned adjacent and coupled to knob 131, and bottom portion 152 of stem is positioned adjacent and coupled to a driver 135 that can adjust valve 120 between the first and second configurations when knob 131 is turned.

As discussed above, auxiliary filtered water connection 140 is configured to receive filtered water. In particular, auxiliary filtered water connection 140 is in fluid communication with filtered water inlet 122 of valve 120. A bypass joint or elbow 141 is mounted to valve 120 at filtered water inlet 122. Bypass joint 141 defines a bypass entrance 142, a bypass outlet 143, and a bypass exit 144. Bypass exit 144 is positioned at filtered water inlet 122 of valve 120 and places valve 120 and bypass joint 131 in fluid communication. Similarly, a conduit 145 extends between and fluidly connects bypass outlet 143 of bypass joint 141 and auxiliary filtered water connection 140.

Conduit 145 is positioned within and extends through bracket 133. In particular, conduit 154 extends between a first portion 154 and a second portion 156. First portion 154 of conduit 145 is connected to auxiliary filtered water connection 140 and passes through a first aperture 157 defines by bracket 133, and second portion 156 of conduit 145 is connected to bypass outlet 143 of bypass joint 141 and passes through a second aperture 158 defined by bracket 133. Second aperture 158 of bracket 133 being disposed below first aperture 157 of bracket 133, e.g., along the vertical direction V.

As an example, filtered water can enter bypass joint 141 at bypass inlet 122 and flow into both bypass outlet 143 and bypass exit 144. Thus, filtered water is supplied to both valve 120 and auxiliary filtered water connection 140. In particular, auxiliary filtered water connection 140 receives filtered water from bypass entrance 142 despite the configuration of valve 120, i.e., whether valve 120 is in either the first or second configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water diverter assembly for a water filter, the water diverter assembly defining a vertical direction, the water diverter assembly comprising:
   a support stand having an upper surface and a lower surface, the lower surface positioned opposite the upper surface;
   a three way valve mounted to said support stand adjacent the lower surface of said support stand, said three way valve having a filtered water inlet, an unfiltered water inlet, and an outlet, said three way valve selectively adjustable between a first configuration and a second configuration, the filtered water inlet being in fluid communication with the outlet in the first configuration, the unfiltered water inlet being in fluid communication with the outlet in the second configuration;
   a selecting mechanism mounted to said support stand adjacent the upper surface of said support stand, said selecting mechanism being in mechanical communication with said three way valve in order to selectively adjust said three way valve between the first and second configurations; and
   an auxiliary filtered water connection mounted to said support stand adjacent the upper surface of said support stand, said auxiliary filtered water connection being in fluid communication with filtered water inlet of said three way valve.

2. The water diverter assembly of claim 1, wherein said selecting mechanism comprises a knob rotatably mounted to said support stand adjacent the upper surface of said support stand.

3. The water diverter assembly of claim 1, wherein said auxiliary filtered water connection comprises a stop valve.

4. The water diverter assembly of claim 1, wherein said three way valve comprises a three port ball valve.

5. The water diverter assembly of claim 1, further comprising a stem that extends between said three way valve and said selecting mechanism in order to couple said three way valve and said selecting mechanism together such that said selecting mechanism selectively actuates said three way valve.

6. The water diverter assembly of claim 1, further comprising a bypass joint that defines a bypass entrance, a bypass outlet, and a bypass exit, the bypass exit positioned at the filtered water inlet of said three way valve.

7. The water diverter assembly of claim 6, further comprising a conduit that extends between the bypass outlet of said bypass joint and said auxiliary filtered water connection.

8. A water diverter assembly for a water filter, the water diverter assembly comprising:
   a support stand having an upper surface and a lower surface, the lower surface of said support stand positioned opposite the upper surface of said support stand;
   a valve mounted to said support stand adjacent the lower surface of said support stand, said valve having a filtered water inlet, an unfiltered water inlet, and an outlet, the outlet being in selective fluid communication with either the filtered water inlet or the unfiltered water;
   a selecting mechanism mounted to said support stand adjacent the upper surface of said support stand, said selecting mechanism configured for selectively adjusting said valve in order to place the outlet of said valve in fluid communication with either the filtered water inlet or the unfiltered water depending upon the type of water selected; and
   an auxiliary filtered water connection mounted to said support stand adjacent the upper surface of said support stand, said auxiliary filtered water connection being in fluid communication with filtered water inlet of said valve.

9. The water diverter assembly of claim 8, wherein said selecting mechanism comprises a knob rotatably mounted to said support stand adjacent the upper surface of said support stand.

10. The water diverter assembly of claim 8, wherein said auxiliary filtered water connection comprises a stop valve.

11. The water diverter assembly of claim 8, wherein said valve comprises a three port ball valve.

12. The water diverter assembly of claim 8, further comprising a stem that extends between said valve and said selecting mechanism in order to couple said valve and said selecting mechanism together such that said selecting mechanism selectively actuates said valve.

13. The water diverter assembly of claim 8, further comprising a bypass joint that defines a bypass entrance, a bypass outlet, and a bypass exit, the bypass exit positioned at the filtered water inlet of said valve.

14. The water diverter assembly of claim 13, further comprising a conduit that extends between the bypass outlet of said bypass joint and said auxiliary filtered water connection.

15. A water diverter assembly for a water filter, the water diverter assembly comprising:
   a support stand configured for resting on a top surface of a countertop when the water diverter is mounted to the countertop;
   a valve mounted to said support stand, said valve having a filtered water inlet, an unfiltered water inlet, and an outlet, the outlet being in selective fluid communication with either the filtered water inlet or the unfiltered water, said valve configured for being positioned below a bottom surface of the countertop when the water diverter is mounted to the countertop;
   a selecting mechanism mounted to said support stand, said selecting mechanism configured for selectively adjusting said valve in order to place the outlet of said valve in fluid communication with either the filtered water inlet or the unfiltered water depending upon the type of water selected, said selecting mechanism configured for being positioned above the top surface of the countertop when the water diverter is mounted to the countertop; and
   an auxiliary filtered water connection mounted to said support stand, said auxiliary filtered water connection being in fluid communication with filtered water inlet of said valve, said auxiliary filtered water connection configured for being positioned above the top surface of the countertop when the water diverter is mounted to the countertop.

16. The water diverter assembly of claim 15, wherein said selecting mechanism comprises a knob rotatably mounted to said support stand.

17. The water diverter assembly of claim 15, wherein said auxiliary filtered water connection comprises a stop valve.

18. The water diverter assembly of claim 15, wherein said valve comprises a three port ball valve.

19. The water diverter assembly of claim 15, further comprising a stem that extends between said valve and said selecting mechanism in order to couple said valve and said selecting mechanism together such that said selecting mechanism selectively actuates said valve, said stem extend through the countertop when the water diverter is mounted to the countertop.

20. The water diverter assembly of claim 15, further comprising a bypass joint that defines a bypass entrance, a bypass outlet, and a bypass exit, the bypass exit positioned at the filtered water inlet of said valve, and a conduit that extends between the bypass outlet of said bypass joint and said auxiliary filtered water connection.

* * * * *